United States Patent [19]
Kakutani

[11] Patent Number: 5,509,085
[45] Date of Patent: Apr. 16, 1996

[54] IMAGE PROCESSOR AND PRINTING APPARATUS WHICH PERFORM BINARY CODING OF COLOR COMPONENTS

[75] Inventor: Toshiaki Kakutani, Nagano, Japan

[73] Assignee: Seiko Epson Corporation, Tokyo, Japan

[21] Appl. No.: 131,377

[22] Filed: Oct. 5, 1993

[30] Foreign Application Priority Data

Oct. 7, 1992 [JP] Japan ................................. 4-268839
Dec. 28, 1992 [JP] Japan ................................. 4-348849

[51] Int. Cl.$^6$ ................................................. G06K 9/38
[52] U.S. Cl. ........................ 382/167; 382/270; 358/518
[58] Field of Search ............................ 382/50, 52, 17, 382/270, 162, 167; 358/518, 529, 521, 515, 465, 466, 502, 534, 536; 395/131

[56] References Cited

U.S. PATENT DOCUMENTS

| | | | |
|---|---|---|---|
| 4,783,837 | 11/1988 | Kawamura et al. | 382/50 |
| 5,128,748 | 7/1992 | Murakami et al. | 358/518 |
| 5,210,602 | 5/1993 | Mintzer | 382/50 |
| 5,243,443 | 9/1993 | Eschbach | 358/455 |

FOREIGN PATENT DOCUMENTS 0444290  9/1991  European Pat. Off. .
0501023  9/1992  European Pat. Off. .

OTHER PUBLICATIONS

Digital Techniques for Producing Under–Colored Halftone Images—T. M. Holladay Xerox Disclosure Journal, vol. 8, No. 6, Nov.–Dec., 1983, Stamford, Cn. p. 531.

Primary Examiner—Michael T. Razavi
Assistant Examiner—Jon Chang
Attorney, Agent, or Firm—Sughrue, Mion, Zinn, Macpeak & Seas; Richard C. Turner

[57] ABSTRACT

An image processor and a color printing apparatus to which the image processor is applied, the image processor having the function of binary-coding color tone image data so that the image data can be output to apparatuses not having a pixel-based tone control system. The image processor includes a first-color-component binary-coding means for binary-coding a first color component, a second-color-component binary-coding means for binary-coding a second color component, a second-color-component threshold controlling means for the second-color-component binary-coding means, the second-color-component threshold controlling means increasing or decreasing a second-color-component binary-coding threshold in accordance with a binary-coded result OFF or ON of the first color component, a third-color-component binary-coding means for binary-coding a third color component, and a third-color-component threshold controlling means for the third-color-component binary-coding means, the third-color-component threshold controlling means increasing or decreasing a third-color-component binary-coding threshold by referring at least to the binary-coded result of the first color component or the binary-coded result of the second color component.

16 Claims, 4 Drawing Sheets

FIG. 2

[PROCESS 1]   BINARY-CODED THE COLOR COMPONENT C
```
correct_C = data_C + error_sum_C();
if( correct_C > slsh_C )
    result_C=255;
else
    result_C=0;
err_C = correct_C - result_C:
```

[PROCESS 2]   M THRESHOLD CONTROLLING MEANS INCREASES OR DECREASES THE THRESHOLD FOR COLOR COMPONENT M IN ACCORDANCE WITH THE BINARY-CODED RESULT OF THE COLOR COMPONENT C
```
if( result_C == 0 )
    slsh_M = slsh_base_M + slsh_add_M;
else
    slsh_M = slsh_base_M - slsh_sub_M;
```

[PROCESS 3]   BINARY-CODED THE COLOR COMPONENT M
```
correct_M = data_M + error_sum_M();
if( correct_M > slsh_M )
    result_M = 255;
else
    result_M = 0;
err_M = correct_M - result_M;
```

[PROCESS 4]   Y THRESHOLD CONTROLLING MEANS INCREASES OR DECREASES A THRESHOLD FOR COLOR COMPONENT Y IN ACCORDANCE WITH THE BINARY-CODED RESULTS OF THE COLOR COMPONENTS C AND M
```
if( result_C == 0 && result_M == 0 )
    slsh_M = slsh_base_M + slsh_add_Y;
else
    slsh_M = slsh_base_M - slsh_sub_Y;
```

[PROCESS 5]   BINARY-CODED COLOR COMPONENT Y
```
correct_Y = data_Y + error_sum_Y();
if( correct_Y > slsh_Y )
    result_Y = 255;
else
    result_Y = 0;
err_Y = correct_Y - result_Y;
```

[PROCESS 6]   BLACK DOT GENERATING MEANS GENERATES K DOT
```
if( result_C == 255 && result_M == 255 && reult_Y == 255) {
    result_C = 0 ;
    result_M = 0 ;
    result_Y = 0 ;
    result_K = 255 ;
} else
    result_K = 0 ;
```

FIG. 3

```
―[PROCESS 1]   BINARY-CODED COLOR COMPONENT R ―
correct_R = data_R + error_sum_R();
if( correct_R > slsh_R )
    result_R=1;
else
    result_R=0;
err_R = correct_R - result_R:
```

```
―[PROCESS 2]   G THRESHOLD CONTROLLING MEANS INCREASES OR ―
               DECREASES THE THRESHOLD FOR COLOR COMPONENT
               G IN ACCORDANCE WITH THE BINARY-CODED RESULT
               OF COLOR COMPONENT R
if( result_R == 0 )
    slsh_G = slsh_base_G + slsh_add_G;
else
    slsh_G = slsh_base_G - slsh_sub_G;
```

```
―[PROCESS 3]   BINARY-CODED COLOR COMPONENT G ―
correct_G = data_G + error_sum_G();
if( correct_G > slsh_G )
    result_G = 1;
else
    result_G = 0;
err_G = correct_G - result_G;
```

```
―[PROCESS 4]   B THRESHOLD CONTROLLING MEANS INCREASES OR ―
               DECREASES A THRESHOLD FOR COLOR COMPONENT B
               IN ACCORDANCE WITH THE BINARY-CODED RESULTS
               OF THE COLOR COMPONENTS R AND G
if( result_R == 0 && result_G == 0 )
    slsh_G = slsh_base_G + slsh_add_B;
else
    slsh_G = slsh_base_G - slsh_sub_B;
```

```
―[PROCESS 5]   BINARY-CODED COLOR COMPONENT B ―
correct_B = data_B + error_sum_B();
if( correct_B > slsh_B )
    result_B = 1;
else
    result_B = 0;
err_B = correct_B - result_B;
```

```
―[PROCESS 6]   BLACK DOT GENERATING MEANS GENERATES K DOT ―
result_C = 1 - result_R ;
result_M = 1 - result_G ;
result_Y = 1 - result_B ;
if( result_C == 1 && result_M == 1 && reult_Y == 1) {
    result_C = 0 ;
    result_M = 0 ;
    result_Y = 0 ;
    result_K = 1 ;
} else
    result_K = 0 ;
```

FIG. 4
```
[PROCESS 6]   BLACK DOT GENERATING MEANS GENERATES K DOT
    if( result_R == 0 && result_G == 0 && reult_B == 0) {
        result_C = 0 ;
        result_M = 0 ;
        result_Y = 0 ;
        result_K = 1 ;
    } else {
        result_C = 1 - result_R ;
        result_M = 1 - result_G ;
        result_Y = 1 - result_B ;
        result_K = 0 ;
    }
```
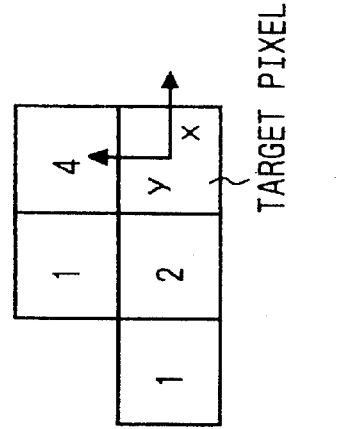
FIG. 5(c)
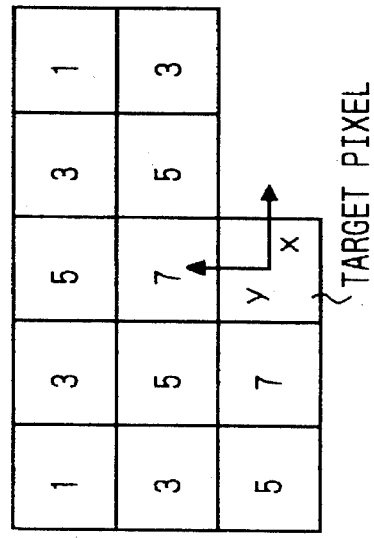
FIG. 5(b)
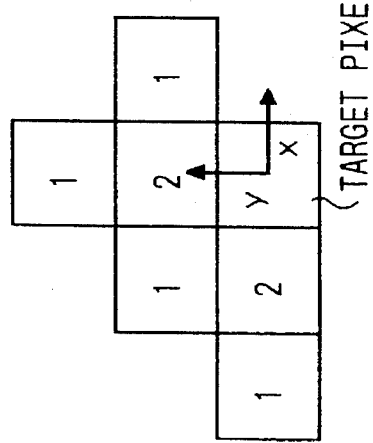
FIG. 5(a)

IMAGE PROCESSOR AND PRINTING APPARATUS WHICH PERFORM BINARY CODING OF COLOR COMPONENTS

BACKGROUND OF THE INVENTION

The invention relates to an image processor and a color printing apparatus to which the image processor is applied, the image processor having the function of binary-coding color half-tone image data so that the image data can be outputted to apparatuses not having a pixel-based tone control system.

In the case of outputting full color image data to printing apparatuses and displays which do not provide tone control on a pixel basis, a binary-coding process is necessary to reduce the tone of the color components of a pixel to two levels: the dot present level and the dot absent level.

An example of printing original image data will be considered using a printing apparatus that can output dots only in two tone levels per color component. The original image data consists of three color components, cyan (C), magenta (M), yellow (Y), which are the primary colors of inks. Each of the color components belonging to a pixel can take a total of 256 tone levels from 0 to 255. In such a case, the C, M, Y dots must be binary-coded for each pixel of the image data to determine that such dots are to be printed (ON) or not (OFF).

Various binary-coding techniques are available. A minimum average error method and an error diffusion method are in wide use and are excellent techniques in terms of resolution and tone reproducibility. The minimum average error method corrects the data value of a pixel to be binary-coded based on a weighted mean value of a quantization error caused in already binary-coded pixels adjacent the pixel to be binary-coded. The error diffusion method adds a quantization error caused at the time of binary-coding a pixel to neighboring pixels that have not yet been binary-coded by diffusion. What makes the former different from the latter is the timing at which the error diffusion process is executed; the two techniques are completely equivalent logically. The error diffusion method is disclosed in "R. Floyd et al., 1975 SID International Symposium Digest of Technical papers, 4.3, pp. 36 (1975) and also in Japanese Patent Unexamined Publication No. 284173/1989 ("IMAGE PROCESSOR AND APPARATUS"). On the other hand, the minimum average error method is disclosed in "J. F. Jarvice, C. N. Judice and W. H. Ninke; Computer Graphics and Image Processing, Vol. 5, No. 1, pp. 13 (1976)".

To apply the minimum average error method or the error diffusion method to the binary-coding of a color image, the error diffusion is performed on a color component basis independently. For example, the process of binary-coding the color component C is performed independently of the color components M and Y. Therefore, whether the C dot is superposed on the M dot or the Y dot on a single pixel is random, which means that no control is provided to make the dot easy or difficult to be superposed, or the like.

A problem arises when gray data that is achromatic is binary-coded. In the case of a printing apparatus having only the primary color inks C, M, Y, a black dot is usually produced by superposing the three color dots one upon another on a single pixel. However, as described above, the ordinary adaptive algorithm for spatial grayscale for color images performs the error diffusing process on each color component independently. Thus, how dots are superposed cannot be completely controlled. In binary-coding achromatic gray data of an intermediate density, the three color dots are superposed at random. That is, besides a dot produced by superposing the three colors C, M, Y, an output including a dot produced by superposing two colors out of the three, a single color dot, and a pixel without color ink also may be present. For example, if gray data in which the tone level of an original image is 128/255 for each of the three color components C, M, Y is binary-coded, the probability that each color component dot will be binary-coded to ON is almost ½. As shown in the following table, total of eight combinations of colors are produced after the pixel-based binary coding process at an almost equal probability of ⅛.

|     | C Dot | M Dot | Y Dot | Color |
| --- | --- | --- | --- | --- |
| (1) | ON | ON | ON | BLACK |
| (2) | ON | ON | OFF | BLUE |
| (3) | ON | OFF | ON | GREEN |
| (4) | ON | OFF | OFF | CYAN |
| (5) | OFF | ON | ON | RED |
| (6) | OFF | ON | OFF | MAGENTA |
| (7) | OFF | OFF | ON | YELLOW |
| (8) | OFF | OFF | OFF | WHITE |

Even if the original image data is achromatic gray, the binary-coded results thereof are a set of pixels whose colors are different. Hence, to adjust such a mixture of different colors so as to be achromatic is quite difficult. Although each of the eight combinations is likely to appear at an equal probability, such probabilities may be disturbed by variations, so that a predetermined combination may appear at a larger ratio than that of another combination, and this causes inconsistency in produced colors. The human eye perceives even slight variations in gray balance. Once a portion that should be gray is colored to be non-achromatic, the mismatching is so overemphasized to the human eye that it perceives a significant deterioration in image quality.

In the case of a printer capable of using black ink (K) besides the three color inks, C, M, Y, a black pixel for case (1) in which all the three color dots C, M, Y are binary-coded to ON can be replaced by a pixel consisting only of K ink (C, M, Y are OFF and only K is ON). This contributes to improving the density and gray balance of the black dots, but the problem that the data consists of pixels of different colors cannot be eliminated. Consequently, the problem of unmatched gray balance is left unsolved.

To obtain stable reproduction of an achromatic area, an under color removal (UCR) technique has been proposed. The UCR technique is designed to remove the black component K from the C, M, Y components before binary-coding. In this case, tone level data of the four color components C', M', Y', and K are generated by the UCR process based on the original image tone data of C, M, Y components, and the color components C', M', Y', K are binary-coded thereafter. The simplest example of the UCR process is as follows.

K=MIN (C, M, Y)

C'=C−K

Y'=Y−K

The C', M', Y', K components are generated by the above algorithm, where MIN (C, M, Y) is the function for finding a minimum of the C, M, Y components.

Then, the C', M', Y', K values obtained by the UCR process are binary-coded by error diffusion method or the like to generate binary-coded dots of the respective color components C, M, Y, K. In the case of using the K ink, the binary-coded results of C', M', Y', K may be printed as they are, whereas in the case of using only the three color inks C, M, Y, then the K dot is replaced by the superposition of the three colors C, M, Y.

If the original image data is achromatic, the values of C, M, Y are equal to one another. Thus, after the UCR process, all of the C', M', Y' components become zero, leaving only the K component. Therefore, the binary-coded results indicate that only the K dot exists. This means that the achromatic area consists only of black dots, thereby avoiding a generation of gray balance unmatching and inconsistency in the produced color due to the gray area being made up of pixels of various colors.

However, this technique involves not only the additional UCR process, but also the binary-coding operation for the K component in addition to the C, M, Y components. Therefore, the scale of the binary-coding operation increases by ⅓, which is a problem. Since the binary-coding operation of the error diffusion method or the like includes a number of process steps and is complicated, any increase in processing time and processing hardware such as a memory is considered a substantial problem.

These are the problems encountered by the conventional adaptive algorithm for spatial grayscale. To summarize, whether the C dot is superposed on the M dot or the Y dot on a single pixel is random, which means that no control is provided to make the dot easy or difficult to be superposed, or the like.

In contrast, a technique for increasing the probability that the respective color dots will be superposed using the error diffusion method has been proposed in Japanese Patent Unexamined Publication No. 6948/1992 ("METHOD OF BINARY-CODING COLOR IMAGE"). The object thereof is to allow binary-coded color image data to be compressed at a high compression ratio. Therefore, a binary-coding technique is provided which is capable of making pixels of the respective colors easy to be superposed. A summary of the concept this technique is as follows.

Binary-coded color component signals of a target pixel are sorted in descending order and binary-coded as sorted. If the binary-coded results of the already binary-coded color components are OFF, then the color components thereafter in descending order are forced to be OFF, making sure that they cannot be ON. According to such technique, small color signal components cannot be ON unless larger color signal components are ON, making the ON dots easy to be superposed.

However, this technique involves the operation of sorting the respective color data of a target pixel in descending order. That is, the binary-coding process cannot be started unless all the color data of the target pixel are ready, which is a problem. Thus, even if the image data per color is to be received on a line basis or on a screen basis, the binary-coding process cannot be started from receipt of the color component, making it necessary for the received color components to be stored until all the color data are ready. From this arises the problem of reduced processing speed and a requirement for larger storage. The object of the above-mentioned publication No. 6948/1992 is only to improve the data compression ratio, and the specification provides no method for controlling gray balance.

SUMMARY OF THE INVENTION

The invention has been made in view of the above circumstances. Accordingly, an object of the invention is to provide an image processor and a color printing apparatus capable of producing an output that maintains excellent gray balance while satisfying the conditions that:

(1) an increase in the number of binary-coding process steps is minimized; and (2) the processing can be initiated without waiting for all the color component data to be available.

To achieve the above and other objects, the invention is applied to an image processor for binary-coding respective color components of tone color image data consisting of three color components. The image processor includes: a first color component binary-coding means for binary-coding a first color component, a second color component binary-coding means for binary-coding a second color component, a second color component threshold controlling means for the second color component binary-coding means, the second color component threshold controlling means increasing or decreasing a second color component binary-coding threshold in accordance with a binary-coded result OFF or ON of the first color component, a third color component binary-coding means for binary-coding a third color component, and a third color component threshold controlling means for the third color component binary-coding means, the third color component threshold controlling means increasing or decreasing a third color component binary-coding threshold by referring to at least one of the binary-coded results OFF or ON of the first color component and the binary-coded results for the second color component.

Further, the color printing apparatus of the invention includes a black dot generating means for replacing a target pixel with a single black ink dot if the respective color components of the target pixel have been binary-coded to ON (a dot is present).

As a result of the above arrangement, when achromatic gray data is binary-coded, such data is made of a substantially black dot, thereby producing a well-gray balanced output.

BRIEF DESCRIPTION OF THE DRAWINGS

FIG. 2 is a diagram showing a second embodiment of the invention using a pseudo-programming language;

FIG. 3 is a diagram showing a third embodiment of the invention using a pseudo-programming language;

FIG. 4 is a diagram showing a Process 6 of FIG. 3 implemented by a different method; and FIGS. 5(a) to 5(c) are diagrams showing examples of a weighting matrix of a minimum average error method of the invention.

DESCRIPTION OF THE PREFERRED EMBODIMENTS

Figure 1:
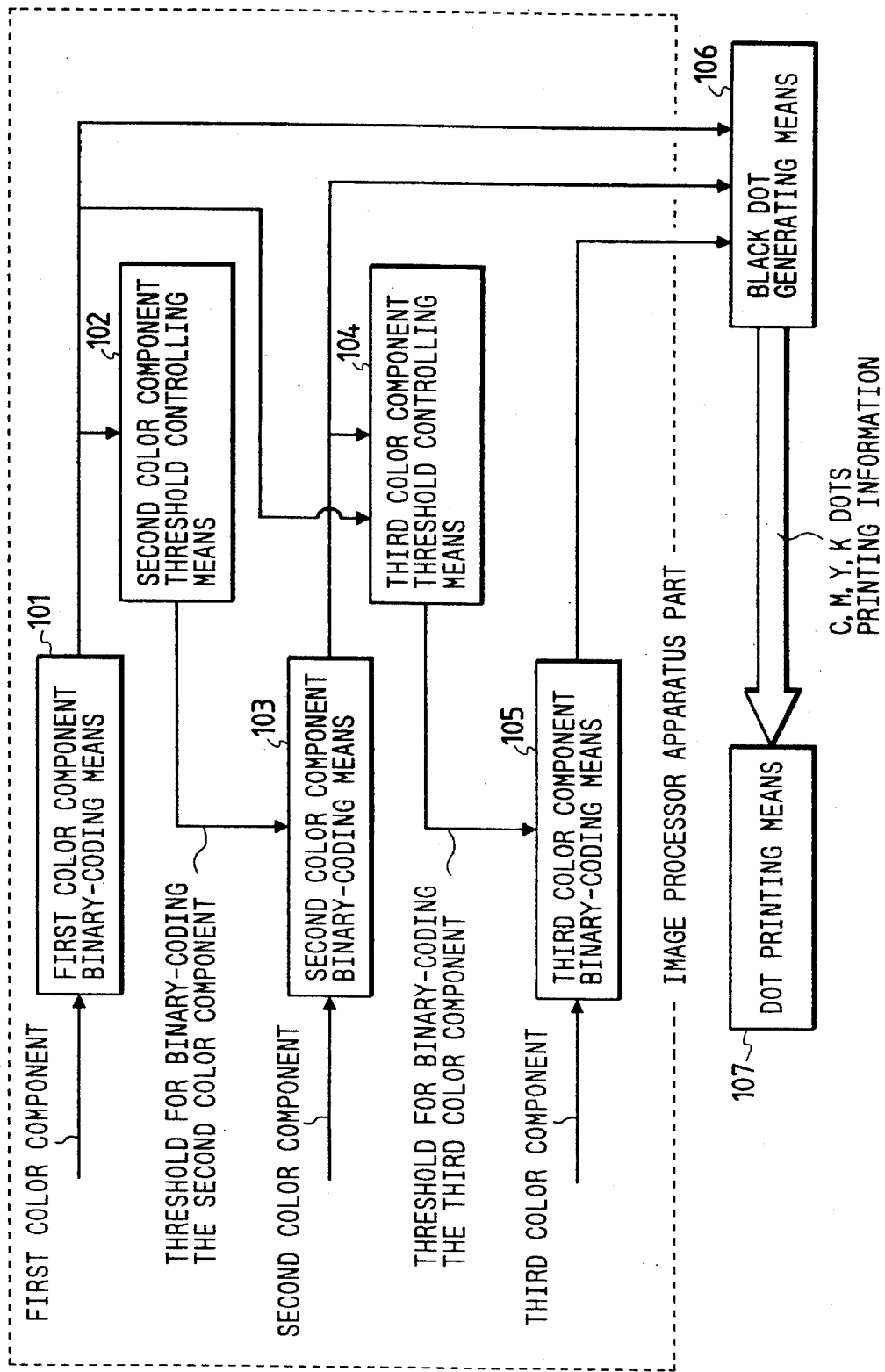
FIG. 1 is a block diagram showing a first embodiment of the invention.

Image processors and printing apparatuses of preferred embodiments of the invention will be described in detail with reference to the drawings.

FIG. 1 shows an image processor and a printing apparatus of a first embodiment of the invention. In this embodiment, a color component 1 is cyan (C), a color component 2 is magenta (M), and a color component 3 is yellow (Y) and the respective color components of a target pixel are binary-coded to ON (a dot is present) and OFF (a dot is absent). The entire portion of FIG. 1 refers to an example of a printing apparatus of the invention, whereas the portion surrounded by a broken line refers only to an image processor of the invention.

Referring to FIG. 1, a binary-coding algorithm used in this embodiment will be described. The following description refers to an example in which a minimum average error method is employed as a basic binary-coding method. In this embodiment, a dot is present (ON) when a color component is binary-coded to a larger value, and a dot is absent (OFF) when a color component is binary-coded to a smaller value.

Process 1

A first color component binary-coding means 101 binary-codes the color component C of a target pixel. The following steps are taken when the mean error minimizing method is used as a binary-coding technique:

1-1 The C data of the target pixel is corrected by a binary-coding error of pixels neighboring the target pixel.

1-2 The corrected C data is binary-coded by comparison with a first color component threshold. That is, if the corrected C data is larger than the first color component threshold, the dot is set to ON, whereas if smaller, the dot is set to OFF.

1-3 A binary-coding error of the color component C caused at the target pixel is calculated. Although the calculated error data is not necessary in the process of binary-coding the target pixel, such data is stored because such data is necessary at the time of binary-coding non-binary-coded neighboring pixels.

Process 2

A second color component threshold controlling means increases or decreases the threshold for binary-coding the second color component M in accordance with the binary-coded result of the first color component C. Specifically, when the color component C is binary-coded to ON (a dot is present), the threshold is decreased, whereas when the color component C is binary-coded to OFF (a dot is absent), the threshold is increased.

Process 3

A second color component binary-coding means 103 binary-codes the color component M using the threshold for binary-coding the second color component M determined by the second color component threshold controlling means 102. The following steps are taken based on the mean error minimizing method:

3-1 The color component M data of the target pixel is corrected by a binary-coding error.

3-2 The corrected M data is binary-coded by comparison with the threshold of the color component M. That is, if the corrected M data is larger than the threshold of the color component M, the corrected M data is binary-coded to ON, whereas if smaller, the corrected M data is binary-coded to OFF.

3-3 A binary-coding error caused at the target pixel is calculated and stored.

Process 4

A third color component threshold controlling means 104 increases or decreases a threshold for binary-coding the third color component Y in accordance with the binary-coded results of the first color component C and the second color component M. Specifically, if both C and M are binary-coded to ON, the threshold is decreased, whereas if C or M is binary-coded to OFF, the threshold is increased.

Process 5

A third color component binary-coding means 105 binary-codes the color component Y using the threshold for binary-coding the third color component Y determined by the third color component threshold controlling means 104 in a manner similar to that for the M component in Process 3. When the mean error minimizing method is used, the following steps are taken:

5-1 The color component Y data of the target pixel is corrected by a binary-coding error of the neighboring pixels.

5-2 The corrected Y data is binary-coded by comparison with the threshold of the color component Y. That is, if the corrected Y data is larger than the threshold of the color component Y, the corrected Y data is binary-coded to ON, whereas if smaller, the corrected Y data is binary-coded to OFF.

5-3 A binary-coding error of the color component Y caused at the target pixel is calculated and stored.

The above describes the embodiment of the image processor of the invention. The following processes are added to the operation of the printing apparatus of the invention.

Process 6

A black dot generating means 106 simply sets a K dot to OFF when any one of C, M, Y components of the target pixel is OFF. When the C, M, Y components of the target pixel are binary-coded to ON, the black dot generating means 106 replaces them with a K dot; i.e., the K dot is set to ON and the C, M, Y dots, to OFF.

Process 7

A dot printing means 107 prints with inks in accordance with the binary-coded results of the C, M, Y, and K dots obtained in Process 6. Printing methods include a wire dot method, an ink jet method, a thermal transfer method, an electrophotographic method, or the like.

To the third color component threshold controlling means 104 in Process 4 of the invention, the following modified processes, Process 4A to Process 4D, may be applied.

Process 4A

The third color component threshold controlling means 104 decreases the threshold when the first color component C is binary-coded to ON, or increases the threshold when C is binary-coded to OFF in accordance with the binary-coded result of C.

Process 4B

The third color component threshold controlling means 104 decreases the threshold when the second color component M is binary-coded to ON, or increases the threshold when M is binary-coded to OFF in accordance with the binary-coded result of M.

Process 4C

The third color component threshold controlling means 104 decreases the threshold when C or M is binary-coded to ON, or increases the threshold when both C and M are binary-coded to OFF in accordance with the binary-coded results of C and M.

Process 4D

The third color component threshold controlling means 104 first decreases the threshold when C is binary-coded to ON, or increases the threshold when C is binary-coded to OFF in accordance with the binary-coded result of C. The third color component threshold controlling means 104 then decreases the threshold when M is binary-coded to ON, or increases the threshold when M is binary-coded to OFF in accordance with the binary-coded result of M.

The examples of Process 4A and Process 4B only refer to the binary-coded result of either the first color component C or the second color component M at the time of binary-coding the third color component Y. However, for reasons that the first color component C and the second color component M have already been made easy to be superposed up to Process 3 and that the number of dots C is equal to the number of dots M in the case of gray data, the M dot is most likely to be binary-coded to ON for a pixel whose C dot has been binary-coded to ON up to Process 3, so that an advantage close to that obtained by referring to both C and M can be obtained by referring only to either one of them.

For the same reasons, in the examples such as Process 4C and Process 4D, a similar advantage can be obtained if the original image data is gray. In the case of Process 4D, the threshold for binary-coding the third color component becomes:

a minimum value if both C and M are binary-coded to ON;

a maximum value if both C and M are binary-coded to OFF; and a mean value if either C or M is binary-coded to ON.

Thus, the threshold varies in three to four levels.

In Process 4A, inter alia, both the second color component threshold controlling means and the third color component threshold controlling means refer only to the binary-coded result of the first color component C. Therefore, it can be said that the image processor of the invention can be implemented with a simple design for the reasons that it is not necessary to store the binary-coded result of the second color component M and that second color component threshold controlling means and the third color component threshold controlling means are of the same construction, etc.

With respect to Process 1 to Process 5 above, Process 1, Process 3, and Process 5 are portions shared in common with the existing mean error minimizing method, whereas the second color component threshold controlling means 102, portions of Process 2 and Process 4 involving the third color component threshold controlling means 104 are material to the invention. These threshold controlling means contribute to increasing the probability of dots being superposed. The principle of such process will be described below.

Generally, in an ordered dither method, a minimum average error method, or the like which involve the binary-coding process by comparison with thresholds, the probability of a binary-coded result being ON increases if the binary-coding threshold is decreased, whereas the probability of a binary-coded result being OFF decreases if the binary-coding threshold is increased. Therefore, when the threshold for binary-coding M is increased or decreased in accordance with the binary-coded result of C as in this embodiment, the probability of M being binary-coded to ON is increased if the binary-coded result of C is ON, whereas the probability of M being binary-coded to OFF is increased if the binary-coded result of C is OFF. As a result, the C dot and the M dot are easy to superpose. In addition, at the time of binary-coding Y, the Y dot can be made easy to be superposed on the C and M dots by decreasing the threshold for binary-coding Y only when the binary-coded results of M and C are ON.

That is, by changing the threshold for binary-coding the second color in accordance with the binary-coded result of the first color, the probability of the first color being superposed upon the second color can be increased or decreased. Furthermore, by changing the threshold for binary-coding the third color in accordance with the binary-coded result of the first color or the binary-coded result of the second color, the probability of the first color being superposed upon the second color can also be increased. Since the invention is designed to artificially make the dots formed of the three colors C, M, and Y easy to be superposed one upon another on the basis of this principle, the probability of the three color dots being binary-coded to ON so that they can be superposed on a single pixel is increased. Thus, in the case of gray original image data in which the numbers of dots C, M, and Y are almost equal to one another, if the threshold has been increased or decreased sufficiently, the majority of pixels fall within two kinds: pixels in which all three colors C, M, Y are set to ON, i.e., the dots to be replaced with K, and pixels in which all the three colors are binary-coded to OFF, i.e., the white dots. This means that there are few cases where the three colors are not superposed on a single dot. In other words, there will be no case where dots of various colors appear in a gray area.

Further, while an example in which the mean error minimizing method is used as the binary-coding technique has been described with respect to the first embodiment, other binary-coding techniques such as an ordered dither method, a multi-level division quantization method, or the like may be employed to binary-code the first color component 1 in Process 1.

Still further, to binary-code the second color component and the third color component in Process 3 and Process 5, the advantage of the superposition probability control mechanism of the invention can be obtained by any binary-coding techniques as long as the such techniques include the binary-coding process based on the comparison with thresholds.

However, since the ordinary ordered dither method or the like changes the output image density to an appreciable degree when the thresholds are simply increased or decreased, special measures may, in some cases, be taken. If the mean error minimizing method according to this embodiment or the adaptive algorithm for spatial grayscale or the like are used as the binary-coding technique, correction is made at the time a next pixel is binary-coded in order to eliminate the error caused at the time a target pixel is binary-coded. As a result, if some changes are made in thresholds, no objectionable fluctuations in the output image density will be encountered.

FIG. 2 is a diagram illustrative of a second embodiment of the invention, in which the first embodiment is further specified by using a pseudo-programming language. The second embodiment is designed to binary-code the respective color components of image data either 0 or 255, the image data consisting of three colors, C, M, and Y and having a total of 256 tone levels (from 0 to 255).

In the second embodiment, operations corresponding to Process 1 to Process 6 in the first embodiment of FIG. 1 are described using a pseudo-programming language similar to the C programming language. While operations (+, −, =, ==, >, &&, etc.), if else sentences for conditional branches, function calls, and the like are similar to C, declarations of constants, variables, functions, etc., are not particularly made nor are they limited. The meanings of the variables and functions used are as follows:

| | |
|---|---|
| data_C, data_M, data_Y | The C, M, Y data of a target pixel. |
| correct_C, correct_M, correct_Y | The corrected data of C, M, Y of a target pixel. |
| result_C, result_M, result_Y | The binary-coded result data of C, M, Y of a target pixel. |
| result_K | The binary-coded result data of K of a target pixel. |
| slsh_C, slsh_M, slsh_Y | The thresholds at the time the color components C, M, Y are binary-coded. |
| slsh_base_M, slsh_base_Y | The basic threshold values of the color components M, Y. |
| slsh_add_M, slsh_add_Y | The increases in threshold of the color components M, Y. |
| slsh_sub_M, slsh_sub_Y | The decreases in threshold of the color components M, Y. |
| err_C, err_M, err_Y | The binary-coding errors of C, M, Y of a target pixel. |
| error_sum_C(), error_sum_M(), error_sum_Y() | The functions for calculating corrections of the color components C, M, Y of a target pixel. |

Further, slsh_C, slsh_base_M, slsh_base_Y, slsh_add_M, slsh_add_Y, slsh_sub_M, slsh_sub_Y are constants. The values taken by such constants in the second embodiment are:

slsh_C=slsh_base_M=slsh_base_Y=127, slsh_add_M=slsh_add_Y=26, and slsh sub M=slsh_sub_Y=26.

The function error_sum_C() in Process 1 of FIG. 2 calculates a correction of the color component C data. This data correcting process is usually performed by the mean error minimizing method. A weighted mean of the binary-coding errors of the color components C caused at already binary-coded neighboring pixels is calculated.

Let it be assumed that the binary-coding error of a pixel above a target pixel by y and left to the target pixel by x is E(x,y), a weight thereof is W(x y), and the pixel above the target pixel (y>0) and a pixel to the left of the target pixel and on the same line as the target pixel (y=0 and x< 0) have already been binary-coded.

When a weighting matrix such as shown in FIG. 5(a) is used in this case,

W(−1,0)=W(0,1)=2

W(−2,0)=W(−1,1)=W(1,1)=W(0,2)=1

A general equation for calculating a weighted mean of the errors is:

(Σ E(x,y)W(x,y))/Σ W(x,y).

However, a combination of x, y, which is the object of the summation operation, is considered only where W is defined.

Specifically, the function error_sum_A() calculates (2·E(−1,0)+2·E(0,1)+E(−2,0)+E(−1,1)+E(1,1)+E(0,2))/( 2+2+1+1+1+1)

for the color component C, and the calculated value is added to renew the calculation. The function error_sum_M() in Process 3 calculates the same thing for the color component M.

The first color component binary-coding threshold slsh_C in Process 1 usually uses a value between two values that could be the binary-coded results. A value 127 is used in this embodiment. The corrected C color component data correct_C is binary-coded to either 0 or 255 by comparison with the threshold slsh C to obtain the binary-coded result data result_C. An error err_C is a binary-coding error of the color component C caused by binary-coding the target pixel. This binary-coding error is referred to by the function error_sum_C() of Process 1 when a next pixel is binary-coded, and is therefore stored for such next binary-coding operation.

Process 2 is the operation of increasing or decreasing the threshold for the second color component M performed by the second color component threshold controlling means. When the binary-coded result of the color component C is 0 relative to slsh_base_M, which is the basic threshold value for the color component M, slsh_add_M is added, whereas when the binary-coded result of the color component C is 255, slsh_sub_M is subtracted. Since in the second embodiment slsh_base M=127 slsh_add M=25 slsh_sub M=25, the threshold slsh_M for the second color component M is:

127+25=152 when the binary-coded result of the color component C is 0, and

127−25=102 when the binary-coded result of the color component C is 255.

The operation of binary-coding the color component M in Process 3 is exactly the same operation as in Process 1 for the color component M, provided, however, that the threshold slsh M already processed in Process 2 is used.

Process 4 is an operation of increasing or decreasing the threshold for the third color component Y performed by the third color component threshold controlling means. When the binary-coded results of the color components C and M is 0 relative to slsh_base_Y, which is the basic threshold value for the color component Y, slsh_add_Y is added, whereas when the binary-coded result of the color component C is 255, slsh_sub_Y is subtracted.

The operation of binary-coding the color component Y in Process 5 is exactly the same operation as in Process 3 for the color component Y.

Process 6 is a portion related to the printing apparatus of the invention and generates result_K for an output to a printer having a black ink and new result_C, result_M, result_Y based on the result_C, result_M, result_Y already obtained by the image processor section of the invention up to Process 5. A detailed description of the final step of actually printing dots will be omitted.

In the second embodiment, the threshold increases or decreases slsh_add_M, slsh_sub_M and slsh_add_Y, slsh_sub_Y are all set to 25. This means a 10% threshold increase or decrease relative to the maximum threshold of image data, which is 255. When a gray tone image, i.e., an image in which the values of the three primary color components C, M, Y are equal to one another has been binary-coded, dots in which all the three colors C, M, Y have been superposed stand for 99% or more with a scanty 10% threshold increase or decrease. This means that the number of pixels in which only one color or two out of C, M, Y are binary-coded to ON accounts for only as small as 1% or less. Besides, the larger the threshold increase is, the more effective the superposition control becomes. Therefore, an appropriate threshold increase or decrease may be set through an evaluation of what value is best for a binary-coding technique or the like to be adopted.

Further, it is not necessary to make all the values slsh_add_M, slsh_sub_M, slsh_add_Y, slsh_sub_Y equal as in this embodiment. In the case of this embodiment, such a setting as slsh_add_M=40 slsh_sub_M=0 is acceptable, imposing few problems. Basically, as long as slsh_add_M>slsh_sub_M is satisfied, the increase or decrease may take a positive, zero, or negative value. The reasons is that, in the case where the advantage of the binary-coding error correction by the mean error minimizing method is obtained as in this embodiment, what affects the probability of dots being binary-coded to ON largely is not the magnitude of a threshold in absolute terms, but the magnitude of a threshold in relative terms with respect to a neighboring pixel.

While a comparison with the image data is made after the threshold increasing or decreasing operation has been completed in this embodiment, this comparison is logically equivalent to performing the operation of increasing or decreasing a magnitude in an opposite sign on the image data side with the threshold fixed. Therefore, either operation may be performed. For example, in Process 2, the threshold is increased as slsh_M=slsh_base_M+slsh_add_M, and then in [Process 3], a comparison is made with the image data such as if(correct_M>slsh_M).

If only this comparison portion is highlighted, it is written as if(correct_M>slsh_base_M+slsh_add_M).

This portion can further be rewritten as if(correct_M−slsh_add_M>slsh_base_M)

so that an increase or decrease is made on the data side with the threshold fixed.

While the basic threshold values slsh_base_M and slsh_base_Y are constants in the above description, they may be variables that vary systematically or at random in accordance with the position of a pixel.

While the mean error minimizing method has been taken as an example in the above embodiment, the adaptive algorithm for spatial grayscale may be a substitute since the adaptive algorithm for spatial grayscale is principally equivalent to the mean error minimizing method. In this case, while a correction of data to be calculated by the function error_sum_M() in Process 3 is expressed as being a sum of errors diffused from neighboring pixels in terms of the adaptive algorithm for spatial grayscale, both are substantially the same. The operations 1-1 to 1-3 in Process 1 of the first embodiment can be described in terms of the adaptive algorithm for spatial grayscale as follows:

Process 1':

1-1' The corrected C data is binary-coded by comparison with the threshold for the color component C. That is, if the corrected C data is larger than the threshold for the color component C, the corrected C data is binary-coded to ON, whereas if smaller, the corrected C data is binary-coded to OFF.

1-2' A binary-coding error of the color component C caused at the target pixel is calculated.

1-3' The binary-coding error data is distributed (error diffused) to non-binary-coded neighboring pixels.

The adaptive algorithm for spatial grayscale starts the error diffusing operation for non-binary-coded neighboring pixels such as in 1-3' at the time the binary-coding error for the target pixel has been calculated. Therefore, once the binary-coding operation for a next target pixel has been started, the corrected data, i.e., error-diffused data, is ready even without the process of calculating the sum of errors such as in 1-1 in Process 1.

While the example shown in FIG. 5(a) is used as the weighting matrix of the mean error minimizing method in the above embodiment, matrices such as shown in FIGS. 5(b) and 5(c) may also be used. Examples are also contemplated in which a different weighting matrix is used per color component, or a plurality of weighting matrices are prepared for binary-coding a single color component so that such a plurality of weighting matrices are selected at random.

While C is assigned to the first color component, M to the second color component, and Y to the third color component in the above embodiments, the assignment of the color components may be arbitrary.

FIG. 3 shows a third embodiment of the invention. Similar to the embodiment of FIG. 2, the third embodiment is also described in a pseudo-programming language similar to the C language. While C, M, Y components, which are the primary colors of subtractive color mixture, are used in the embodiments of FIGS. 1 and 2, red (R), green (G), and blue (B), which are the primary colors of additive color mixture, are assigned as the first color component, the second color component, and the third color component in this embodiment.

There will now be described examples in which such color components R, G, and B are binary-coded. While the color components are binary-coded to either 0 or 255 by dividing the original image data into 256 tone levels from 0 to 255 in the second embodiment, the number of tone levels is not limited to a particular value in this embodiment. That is, the original image data takes a real value from 0 to 1, and such real value is binary-coded to 0 (a dot is OFF) or to 1 (a dot is ON). However, a negative pixel in this embodiment is a positive pixel in the second embodiment; i.e., when all the dots R, G, B are binary-coded to ON, the pixel becomes white (highlighted), whereas when all the dots are binary-coded to OFF, the pixel becomes black.

The meanings of variables and functions of the third embodiment are as follows:

| | |
|---|---|
| data_R, data_G, data_B | The R, G, B data of a target pixel. |
| correct_R, correct_G, correct_B | The corrected data of R, G, B of a target pixel. |

| | |
|---|---|
| result_R, result_G, result_B | The binary-coded result data of R, G, B of a target pixel. |
| slsh_R, slsh_G, slsh_B | The thresholds at the time the color components R, G, B are binary-coded. |
| slsh_base_G, slsh_base_B | The basic threshold values of the color components G, B. |
| slsh_add_G, slsh_add_B | The increases in threshold of the color components G, B. |
| slsh_sub_G, slsh_sub_B | The decreases in threshold of the color components G, B. |
| err_R, err_G, err_B | The binary-coding errors of R, G, B of a target pixel. |
| error_sum_R(), error_sum_G(), error_sum_B() | The functions for calculating corrections of the color components R, G, B of a target pixel. |
| result_K | The binary-coded result data of K of a target pixel. |

Further, slsh_R, slsh_base_G, slsh_base_B, slsh_add_G, slsh_add_B, slsh_sub_G, slsh_sub_B are constants, whose values are:

slsh_R=slsh_base_G=slsh_base_B=0.5, slsh_add_G=slsh_add_B=0.1, slsh_sub_G=0.2, and slsh_sub_B=0 in this embodiment.

Since most of the variables and functions for _C, _M, _Y in FIG. 2 are only substituted by those for _R, _G, _B, and since the operation of the image processor section in Process 1 to Process 5 is similar if only C, M, Y are substituted by R, G, B, a further description thereof will be omitted. As for the portion related to the printing apparatus in Process 6, a negative-positive conversion process for converting the binary-coded results of R, G, B to those of C, M, Y is required in the third embodiment. Specifically, what makes the third embodiment different from the embodiment of FIG. 2 is that the process step of obtaining C, M, Y by reversing the binary-coded results of R, G, B is inserted in the initial part.

FIG. 4 is a rewritten version of Process 6 of FIG. 3. The results obtained by this version is the same. The process of FIG. 4 does not involve the step of expressly performing the R, G, B to C, M, Y converting operation initially as shown in FIG. 3, but detects an event in which all C, M, Y dots are binary-coded to ON under a conditional expression:

(result R==0 && result G==ϕ && result B==ϕ).

While embodiments implemented by the pseudo-programming language similar to the C language have been presented in FIGS. 2 to 4, this is only for the purpose of indicating the data processing contents. These embodiments can be implemented by hardware as well.

As described above, the image processor of the invention is characterized as allowing all the dots of three color components to be easily superposed merely by performing a simple operation such as a threshold increasing or decreasing operation by the second color component threshold controlling means and the third color component threshold controlling means. As a result, in the case of binary-coding gray data, an output consisting only of substantially two kinds of pixels, a pixel for which all the three color dots are binary-coded to ON and a pixel for which no color dots are binary-coded to ON, can be obtained. This feature contributes to producing a high-definition output image with less defective gray balance compared with a case where gray dots consist of a variety of color dots.

The threshold controlling means of the image processor of the invention is characterized as referring to the binary-coded results of the already binary-coded color components only. Therefore, it is not necessary to wait for all the color data of a target pixel to be ready. This feature contributes to receiving the respective color component data in any sequence, e.g., pixel sequential, line sequential, or screen sequential, etc., flexibly. Since the amount of the binary-coded data is largely reduced compared with that of the original image data, this is advantageous in saving storage capacity. Particularly, since the design such that the third color component threshold controlling means refers only to the binary-coded data of the first color component can dispense with referring to the binary-coded result of the second color component, such design is advantageous in a screen sequential system or the like.

The printing apparatus of the invention is characterized as including, in addition to the image processor of the invention, the black dot generating means that replaces a dot whose color components C, M, Y have been binary-coded to ON with a black-ink dot. Therefore, the gray data is outputted in the black ink, thereby allowing further improved gray balance to be maintained. What is more advantageous is that no further complicated binary-coding process is required to be added therefor.

What is claimed is:

1. In an operation of binary-coding respective color components of half-tone color image data consisting of three color components, an image processor comprising:

a first-color-component binary-coding means for binary coding a first color component to provide a first binary-coded result;

a second-color-component binary-coding means for binary-coding a second color component to provide a second binary-coded result;

a second-color-component threshold controlling means for said second-color-component binary-coding means, said second-color-component threshold controlling means receiving the first binary-coded result and adjusting a second-color-component binary-coding threshold in accordance with the first binary-coded result, wherein the first binary-coded result is used directly to adjust the second-color-component binary-coding threshold;

a third-color-component binary-coding means for binary-coding a third color component; and a third-color-component threshold controlling means for said third-color-component binary-coding means, said third-color-component threshold controlling means receiving at least one of the first and second binary-coded results and adjusting a third-color-component binary-coding threshold in accordance with at least one of the first and second binary-coded results, wherein at least one of the first and second binary-coded results is used directly to adjust the third-color-component binary-coding threshold.

2. The image processor according to claim 1, wherein said third-color-component threshold controlling means refers particularly to the first binary-coded result, and increases or decreases the threshold for the third color component in accordance with only the first binary-coded result.

3. The image processor according to claim 1, wherein at least one of said second-color-component binary-coding means and said third-color-component binary-coding means operates in accordance with one of a minimum average error method and an error diffusion method.

4. The image processor according to claim 2, wherein at least one of said second-color-component binary-coding means and said third-color component binary-coding means operates in accordance with one of a minimum average error method and an error diffusion method.

5. A printing apparatus for printing dots using inks of four colors including three color components and black, comprising:

an image processor comprising:

a first-color-component binary-coding means for binary coding a first color component to provide a first binary-coded result;

a second-color-component binary-coding means for binary-coding a second color component to provide a second binary-coded result;

a second-color-component threshold controlling means for said second-color-component binary-coding means, said second-color-component threshold controlling means receiving the first binary-coded result and adjusting a second-color-component binary-coding threshold in accordance with the first binary-coded result, wherein the first binary-coded result is used directly to adjust the second-color-component binary-coding threshold;

a third-color-component binary-coding means for binary-coding a third color component;

a third-color-component threshold controlling means for said third-color-component binary-coding means, said third-color-component threshold controlling means receiving at least one of the first and second binary-coded results and adjusting a third-color-component binary-coding threshold in accordance with at least one of the first and second binary-coded results, wherein at least one of the first and second binary-coded results is used directly to adjust the third-color-component binary-coding threshold; and a block dot generating means for replacing a target pixel with a single black ink dot if all three color components of the target pixel have been binary-coded to an ON state in a binary-coding operation performed by said image processor.

6. The image processor according to claim 5, wherein said third-color-component threshold controlling means refers particularly to the first binary-coded result, and increases or decreases the threshold for the third color component in accordance with only the first binary-coded result.

7. The image processor according to claim 5, wherein at least one of said second-color-component binary-coding means and said third-color-component binary-coding means operates in accordance with one of a minimum average error method and an error diffusion method.

8. The image processor according to claim 6, wherein at least one of said second-color-component binary-coding means and said third-color component binary-coding means operates in accordance with one of a minimum average error method and an error diffusion method.

9. A method of binary-coding respective color components of half-tone color image data consisting of three color components, comprising the steps of:

binary-coding a first color component to provide a first binary-coded result;

adjusting a second-color-component binary-coding threshold in accordance with the first binary-coded result, wherein the first binary-coded result is used directly to adjust the second-color-component binary-coding threshold;

binary-coding a second color component, utilizing the adjusted second-color-component binary-coding threshold, to provide a second binary-coded result;

adjusting a third-color-component binary-coding threshold in accordance with a least one of the first and second binary-coded results, wherein at least one of the first and second binary-coded results is used directly to adjust the third-color-component binary-coding threshold;

binary-coding a third color component, utilizing the adjusted third-color-component binary-coding threshold, to provide a third binary-coded result.

10. The method according to claim 9, wherein said step of adjusting the third-color-component binary-coding threshold is performed in accordance with only the first binary-coded result.

11. The method according to claim 9, wherein at least one of said steps of binary-coding the first, second and third color components is performed using a minimum average error method.

12. The method according to claim 9, wherein at least one of said steps of binary-coding the first, second and third color components is performed using an error diffusion method.

13. A method for printing dots using inks of at least four colors, including three color components and black, comprising the steps of:

binary-coding a first color component to provide a first binary-coded result;

adjusting a second-color-component binary-coding threshold in accordance with the first binary-coded result, wherein the first binary-coded result is used directly to adjust the second-color-component binary-coding threshold;

binary-coding a second color component, utilizing the adjusted second-color-component binary-coding threshold, to provide a second binary-coded result;

adjusting a third-color-component binary-coding threshold in accordance with a least one of the first and second binary-coded results, wherein at least one of the first and second binary-coded results is used directly to adjust the third-color-component binary-coding threshold;

binary-coding a third color component, utilizing the adjusted third-color-component binary-coding threshold, to provide a third binary-coded result;

utilizing the first, second and third binary-coded results to print color dots at a target pixel; and printing a black dot if the first, second and third binary-coded results all correspond to an ON state.

14. The method according to claim 13, wherein said step of adjusting the third-color-component binary-coding threshold is performed in accordance with only the first binary-coded result.

15. The method according to claim 13, wherein at least one of said steps of binary-coding the first, second and third color components is performed using a minimum average error method.

16. The method according to claim 13, wherein at least one of said steps of binary-coding the first, second and third color components is performed using an error diffusion method.

* * * * *